US006909740B1

(12) United States Patent
Atsuta

(10) Patent No.: US 6,909,740 B1
(45) Date of Patent: Jun. 21, 2005

(54) MODEM APPARATUS, COMMUNICATION CONTROL APPARATUS, COMMUNICATION TERMINAL APPARATUS AND COMMUNICATION CONTROL METHOD

(75) Inventor: Akira Atsuta, Tokyo (JP)

(73) Assignee: Panasonic Communications Co., Ltd., Tokyo (JP)

(*) Notice: Subject to any disclaimer, the term of this patent is extended or adjusted under 35 U.S.C. 154(b) by 0 days.

(21) Appl. No.: 09/522,602

(22) Filed: Mar. 10, 2000

(30) Foreign Application Priority Data

Sep. 10, 1999 (JP) .......................................... 11-257399

(51) Int. Cl.[7] ................................................ H04L 5/16
(52) U.S. Cl. ..................................................... 375/222
(58) Field of Search ............................... 375/219, 220,
375/222, 221; 370/278, 282, 276, 279;
455/39, 40, 41, 73, 554, 555, 557, 415,
412, 403, 408, 558, 553, 560; 379/93.09

(56) References Cited

U.S. PATENT DOCUMENTS

| | | | | |
|---|---|---|---|---|
| 5,745,487 | A | * | 4/1998 | Hamaki ...................... 370/352 |
| 5,751,441 | A | * | 5/1998 | Morimoto ................... 358/435 |
| 5,805,678 | A | * | 9/1998 | Okamoto et al. ......... 379/100.01 |
| 5,812,281 | A | * | 9/1998 | Mukai et al. ................ 358/435 |
| 5,847,752 | A | * | 12/1998 | Sebestyen ................ 348/14.12 |
| 5,963,622 | A | * | 10/1999 | Walsh ....................... 379/93.33 |
| 6,097,505 | A | * | 8/2000 | Miwa et al. ................. 358/434 |
| 6,295,313 | B1 | * | 9/2001 | Noma et al. ................. 375/222 |
| 6,311,233 | B1 | * | 10/2001 | Nishioka et al. .............. 710/14 |
| 6,452,963 | B1 | * | 9/2002 | Lee ............................. 375/222 |
| 6,463,132 | B1 | * | 10/2002 | Yoshida et al. ........... 379/93.09 |
| 6,504,919 | B1 | * | 1/2003 | Takagi et al. ............ 379/100.17 |

FOREIGN PATENT DOCUMENTS

| | | |
|---|---|---|
| JP | 61-186070 | 8/1986 |
| JP | 62269564 | 11/1987 |
| JP | 8-56241 | 2/1996 |
| JP | 8-79483 | 3/1996 |
| JP | 9-116718 | 5/1997 |
| JP | 11-88632 | 3/1999 |

OTHER PUBLICATIONS

English Language Abstract of JP 61–186070.
English Language Abstract of JP 8–79483.
English Language Abstract of JP 8–56241.
English Language Abstract of JP 11–88632.
English Language Abstract of JP 9–116718.

* cited by examiner

*Primary Examiner*—Emmanuel Bayard
(74) *Attorney, Agent, or Firm*—Greenblum & Bernstein, P.L.C.

(57) ABSTRACT

A communication control apparatus of the present invention detects a procedure signal transmitted from a calling side from signals received in reception section while or after a transmission section, which transmits procedure signals specified in the predetermined Recommendation, transmits a DIS signal specified in Recommendation T.30 or a procedure signal used in a data communication. Then, the apparatus shifts to a communication operation conforming to Recommendation V.8 when the detected procedure signal is a CM signal specified in Recommendation V.8, while shifting to a data communication operation when the detected signal is the procedure signal used in the data communication. Thus, the present invention enables the apparatus to shift to the communication operation corresponding to the detected procedure signal, and therefore it is possible to assuredly prevent the apparatus from causing the looped condition thereof.

23 Claims, 8 Drawing Sheets

MODEM APPARATUS, COMMUNICATION CONTROL APPARATUS, COMMUNICATION TERMINAL APPARATUS AND COMMUNICATION CONTROL METHOD

BACKGROUND OF THE INVENTION

1. Field of the Invention

The present invention relates to a modem apparatus, communication control apparatus and communication terminal apparatus with the function of performing communications based on the communication procedure conforming to a predetermined Recommendation of ITU-T Recommendations and the communication control method therefor.

2. Description of the Related Art

A communication terminal apparatus provided with a modem for performing communications based on the communication procedure conforming to the predetermined Recommendation of ITU-T Recommendations has conventionally performed communications based on the communication procedure conforming to the predetermined Recommendation as an answering terminal by exchanging procedure signals, which are expected in the communication procedure, with a calling terminal.

For example, as illustrated in FIG. 1A, the communication terminal apparatus provided with a modem for performing communications based on the communication procedure conforming to ITU-T Recommendation V.32 (hereinafter referred to as "Recommendation V.32") as an answering terminal transmits an ANS signal to a calling terminal in response to a call placed from the calling terminal. The calling terminal transmits an AA signal to the answering terminal after detecting the ANS signal. The answering terminal transmits an AC signal to the calling terminal after detecting the AA signal. Further, as illustrated in FIG. 1B, the communication terminal apparatus provided with the modem for performing communications based on the communication procedure conforming to Recommendation V.32 as the answering terminal transmits the ANS signal to the calling terminal in response to the received signal, and when a predetermined time passes after transmitting the ANS signal, further transmits the AC signal to the calling terminal. The calling terminal transmits the AA signal to the answering terminal after detecting the AC signal. Thus, the calling and answering terminals mutually transmit and receive expected procedure signals, thereby performing communications based on the communication procedure conforming to Recommendation V.32.

However, in the conventional communication terminal apparatus, when the procedure signals are transmitted and received according to a sequence specified in the predetermined Recommendation, the case sometimes occurs that the procedure signal transmitted from the answering terminal is not correctly identified at the calling terminal. Thereby, the calling terminal cannot transmit the procedure signal expected by the answering terminal, resulting in the problem that the communication causes the looped condition thereof.

In the above-mentioned example, for example, in the case illustrated in FIG. 1C, when the answering terminal transmits the ANS signal to the calling terminal, the case sometimes occurs that the calling terminal does not recognize the ANS signal correctly, and transmits the CM signal specified in Recommendation V.8 to the answering terminal. In this case, the answering terminal continues to transmit the AC signal to the calling terminal because the AA signal expected from the AC signal is not transmitted from the calling terminal. Meanwhile, the calling terminal continues to transmit the CM signal to the answering terminal because a JM signal expected from the CM signal is not transmitted from the answering terminal. Thereby, the communication causes the looped condition thereof.

Such a problem occurs similarly in the communication terminal apparatus provided with a modem for performing communications based on the communication procedure conforming to Recommendation T.30. Namely, as illustrated in FIG. 2A, the answering terminal continues to transmit a DIS signal to the calling terminal after transmitting the DIS signal because a DCS signal expected from the DIS signal is not transmitted from the calling terminal. Meanwhile, the calling terminal also continues to transmit the CM signal to the answering terminal because the JM signal expected from the CM signal is not transmitted from the answering terminal. Further, also in the case illustrated in FIG. 2B, the answering terminal continues to transmit the DIS signal after transmitting the DIS signal because the DCS signal expected from the DIS signal is not transmitted from the calling terminal. Meanwhile, the calling terminal continues to transmit the AA signal because the AC signal expected from the AA signal is not transmitted from the answering terminal. Thus, the communication causes the looped condition thereof.

SUMMARY OF THE INVENTION

An object of the present invention is to provide a modem apparatus, communication control apparatus, communication terminal apparatus and communication control method capable of responding to the communication procedure specified in an arbitrary Recommendation and assuredly preventing the apparatus from causing the looped condition thereof.

To solve the above-mentioned problem, the apparatus and method of the present invention detect a procedure signal transmitted from a calling terminal while or after a transmission section, which transmits procedure signals specified in the predetermined Recommendation, transmits a DIS signal specified in Recommendation T.30 or a procedure signal used in data communication, from signals received in a reception section, then in the case where the procedure signal is a CM signal specified in Recommendation V.8, shifts the operation to the communication operation conforming to Recommendation V.8, and in the case where the procedure signal is that used in the data communication, shifts the operation to the data communication operation.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENT

One embodiment of the present invention is explained specifically below with reference to accompanying drawings.

Figure 1A:
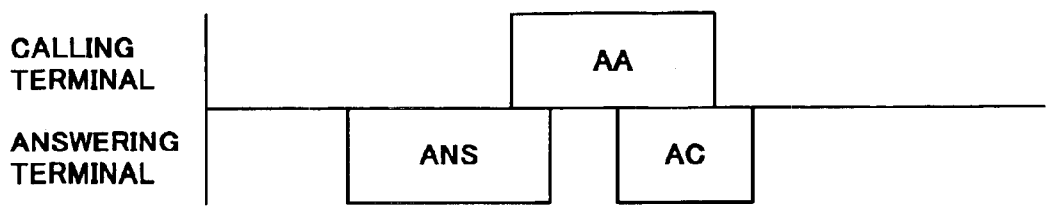
FIG. 1A is a sequence diagram in conventional communication terminal apparatuses.
Figure 1B:
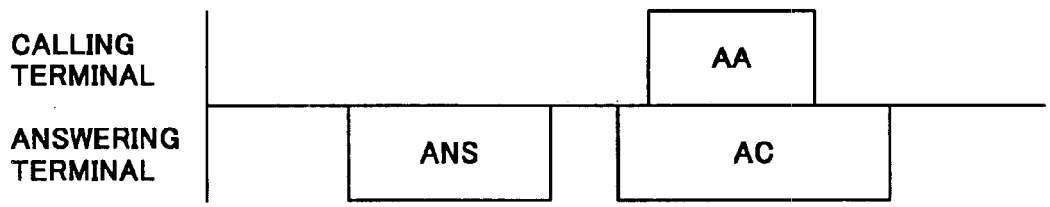
FIG. 1B is a sequence diagram in conventional communication terminal apparatuses.
Figure 1C:
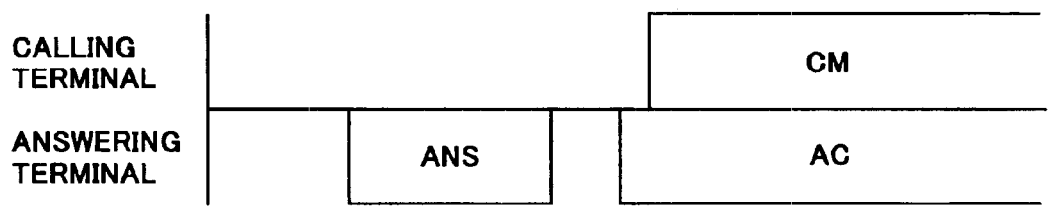
FIG. 1C is a sequence diagram in conventional communication terminal apparatuses.
Figure 2A:
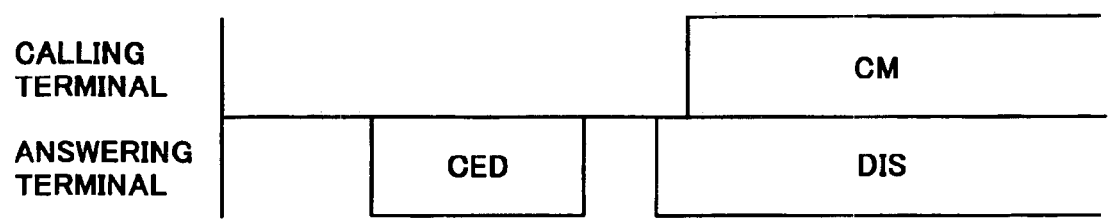
FIG. 2A is another sequence diagram in the conventional communication terminal apparatuses.
Figure 2B:
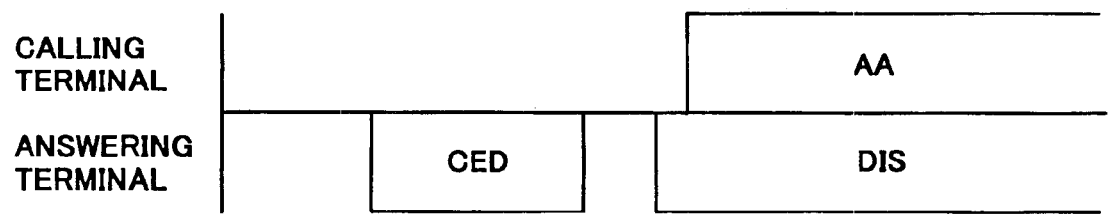
FIG. 2B is another sequence diagram in the conventional communication terminal apparatuses.
Figure 3:
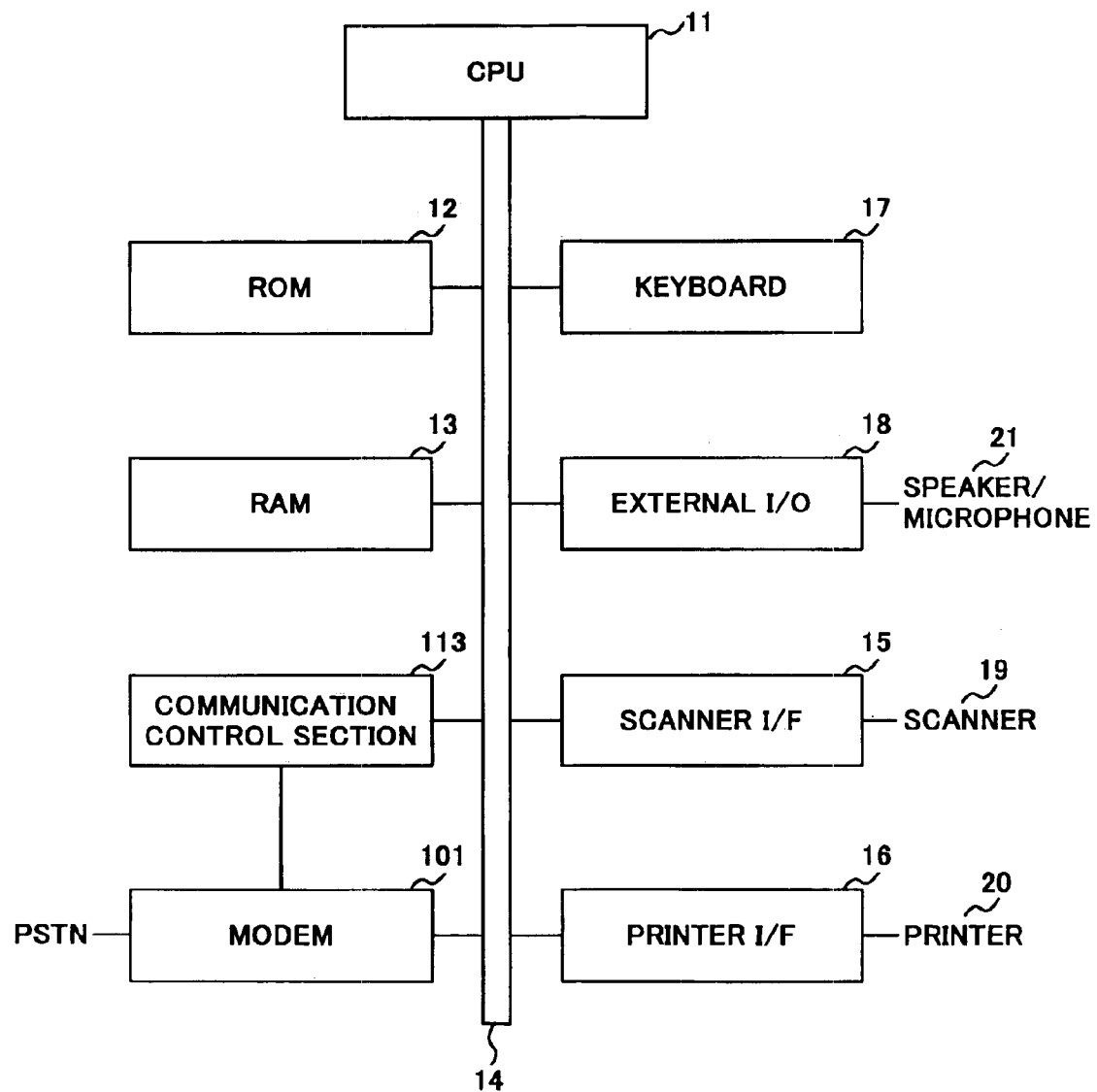
FIG. 3 is a hardware block diagram of a communication terminal apparatus according to an embodiment of the present invention.

FIG. 3 is a hardware block diagram of the communication terminal apparatus 1 according to the above embodiment. Specific examples of the communication terminal apparatus 1 are, for example, a facsimile apparatus, a personal computer or a multi-function apparatus which has a facsimile function, copy function and printer function and so on.

CPU (Central Processing Unit) 11 controls operations of each composition of the communication terminal apparatus 1 by executing various programs stored in ROM 12. RAM 13 is a main-memory, Which is used by CPU 11 in executing the program read from ROM 12 and date.

Scanner I/F 15, printer I/F 16, keyboard 17, external I/O 18 are connected with CPU 11 via bus 14. CPU 11 controls operations of them by executing program stored in ROM 12.

Scanner I/F 15 is an interface connectable to scanner 19. CPU11 controls the operation of scanner 19 via scanner I/F 15. Scanner 19 scans image date of documents according to control of CPU 11.

Printer I/F 16 is an interface connectable to printer 20. CPU11 controls the operation of printer 20 via Printer I/F 16. Printer 20 prints out, for example image date received with modem, which is described later, according to control of CPU 11.

Keyboard 17 is for use in receiving instructions from operator of the communication terminal apparatus. The operator operates the communication terminal apparatus by inputting predetermined instructions.

External I/O 18 communicates date with external apparatuses 21, such as a speaker and microphone which input/output date of predetermined speech signals and so on. External I/O 18 is, for example, a serial interface including USB (Universal Serial Bus).

Moreover modem 101 and communication control section 113 are connected with CPU 11 via bus 14. CPU 11 controls operations of them by executing program stored in ROM 12.

Modem 101 controls transmission/reception of date and signals between public switched telephone networks (PSTN). Modem 101 is provided with a variable signal detection section, which is capable of calculating an integrated value of a signal component at a specific carrier frequency. This variable signal detection section is described later.

Communication control section 113 works as a host of modem 101 (hereinafter, Communication control section is refer to as host). Host 113 controls date communication and facsimile communication via the PSTN, by controlling modem 101.

Host 113 is provided with a detection frequency table that is used in setting frequency detectable by the variable signal detection section of modem 101. Host 113 is further provided with a communication capability table that is used in setting communication capabilities of the communication terminal apparatus 1. Host 113 is provided with the detection frequency table and communication capability table according to one embodiment of the present invention, however it may be possible to provide RAM 13 with these tables.

Figure 4:
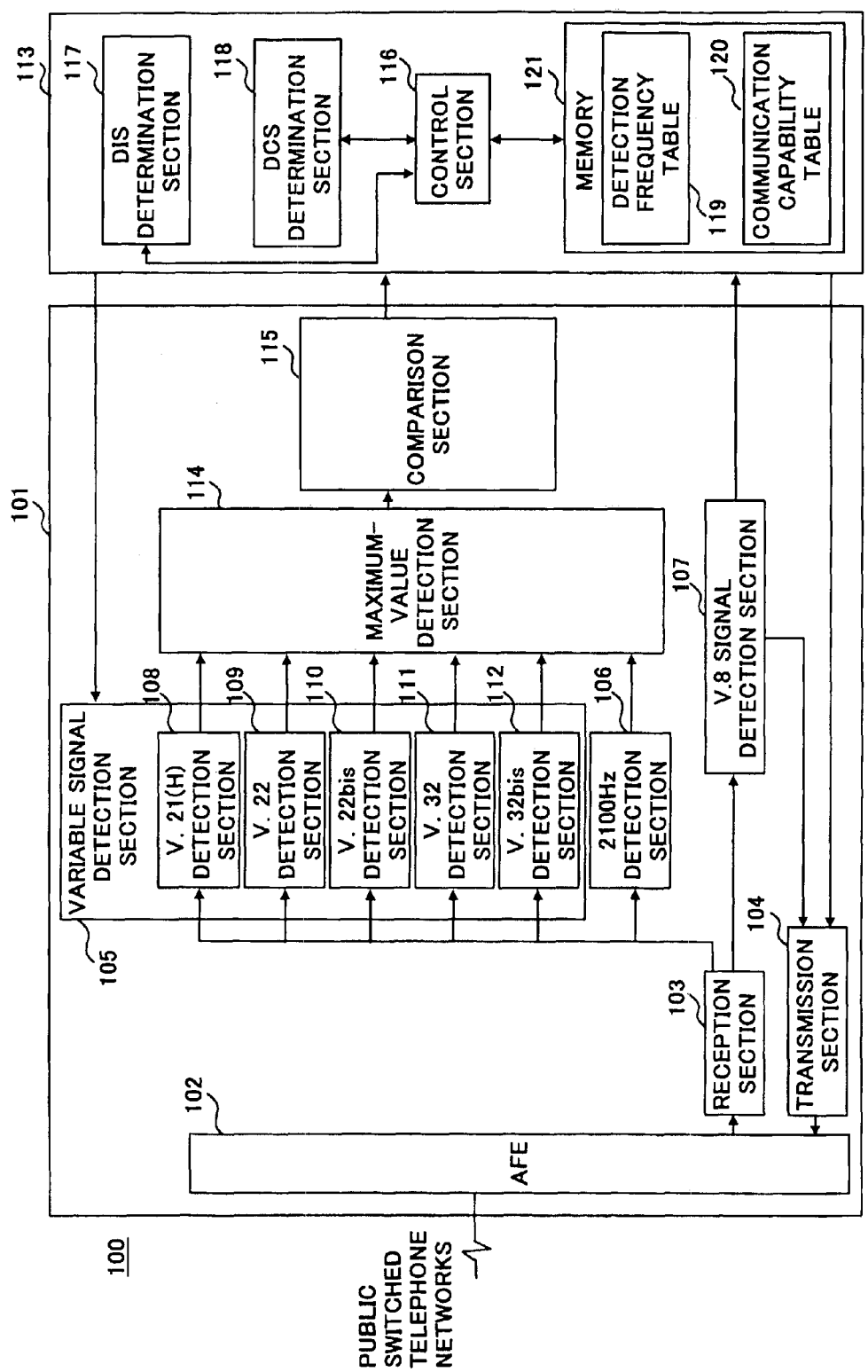
FIG. 4 is a block diagram of a communication control unit of the communication terminal apparatus according to one embodiment of the present invention.

FIG. 4 is a block diagram of a communication control unit 100 comprised with the above-mentioned modem 101 and host 113. In this embodiment, this communication control unit 100 has the function of performing communications based on the communication procedure conforming to Recommendation V.8.

In FIG. 4. modem 101 is comprised of DSP (Digital Signal Processor) and controls operations of, for example, internal signals by itself. Modem 101 is connected to a PSTN (Public Switched Telephone Networks) through AFE (Analog Front End) 102. AFE 102 is connected to reception section 103 that receives, for example, signals from the PSTN and transmission section 104 that transmits, for example, signals to the PSTN. Reception section 103 is connected to variable signal detection section 105, detection section 106 that detects a signal of 2100 Hz (hereinafter referred to as "2100 Hz detection section") and V.8 signal detection section 107. Transmission section 104 is connected to V.8 signal detection section 107.

Variable signal detection section 105 has a plurality of band pass filters each capable of calculating an integrated value of a signal component at a specific carrier frequency. Host 113 sets the integrated value of the signal component at the specific carrier frequency to be calculated at each of the band pass filters. Hereinafter, in the case where host 113 sets an integrated value of a signal component at a carrier frequency of a high channel in Recommendation V.21 (hereinafter referred to as "Recommendation V.21 (H)")at one of the bandpass filters, the bandpass filter is referred to as V21(H) detection section 108. Variable signal detection section 105 calculates the integrated value of the signal components at carrier frequency set by host 113 as described above. FIG. 4 illustrates the case where host 113 sets other band pass filters as V.22 detection section 109, V.22bis detection section 110, V.32 detection section 111, and V.32bis detection section 112 besides V.21(H) detection section 108.

Figure 5:
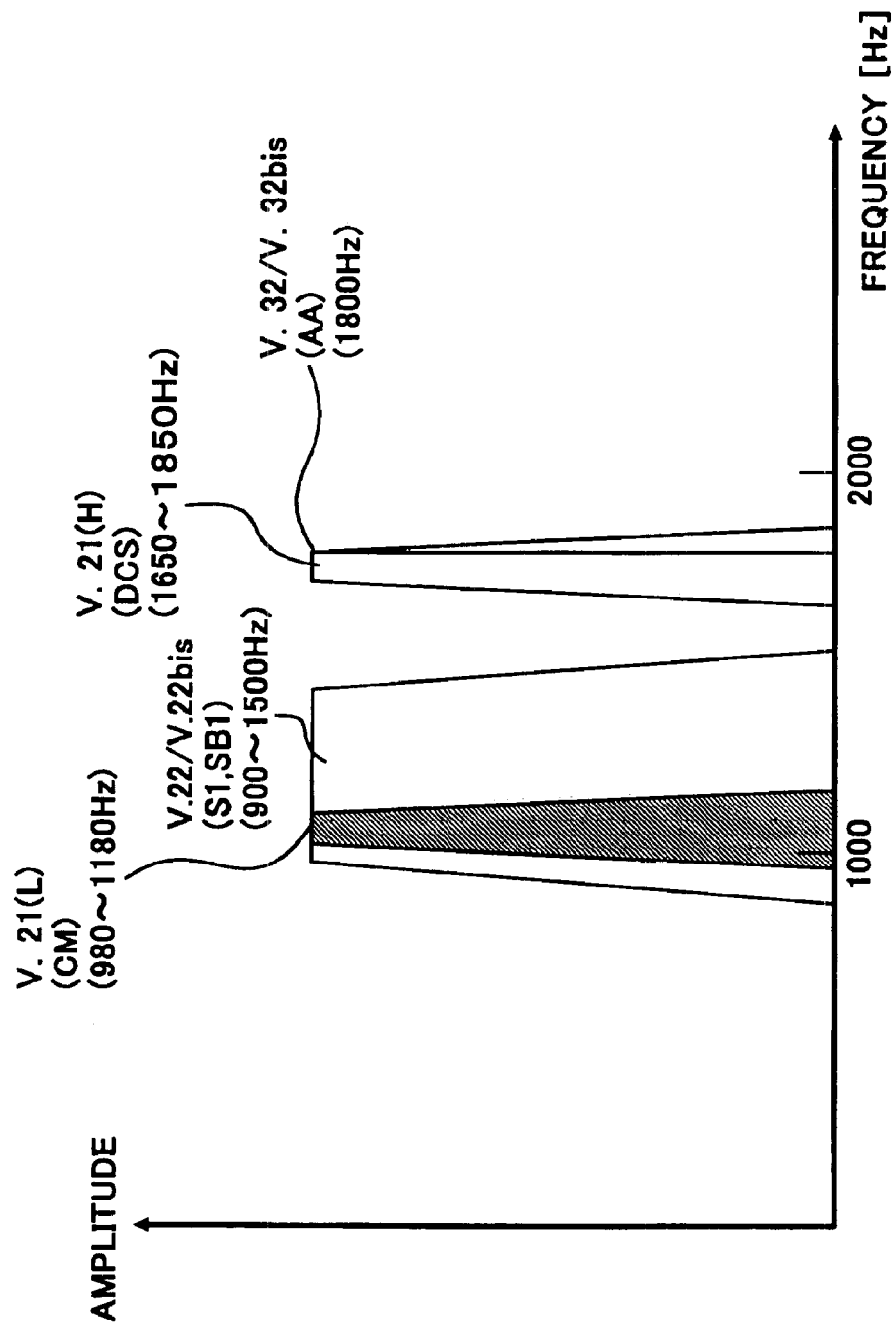
FIG. 5 is a diagram illustrating carrier frequencies at which signal components are calculable in a variable signal detection section in the communication control unit of the communication terminal apparatus according to the above embodiment.

FIG. 5 Illustrates specific carrier frequencies at which signal components are calculable in variable signal detection 105 that is set as illustrated in FIG. 4.

V.21(H) detection section 108 calculates the integrated value of the signal component at a carrier frequency band of 1650 Hz to 1850 Hz used in Recommendation V.21(H). Specifically, V.21(H) detection section 108 calculates the integrated value of the signal component at the carrier frequency of the DCS signal that is transmitted from a calling terminal to an answering terminal in Recommendation T.30, as the signal energy.

V.22 detection section 109 and V.22bis detection section 110 each calculates an integrated value of a signal component at a carrier frequency band of 900 Hz to 1500 Hz used in Recommendation V.22 and Recommendation V.22bis. Specifically, V.22 detection section 109 and V.22bis detection section 110 each calculates the integrated values of the signal components at the carrier frequency band of the S1 signal and SB1 signal that are transmitted from a calling terminal to an answering terminal in Recommendation V.22 and Recommendation V22bis, as the respective signal energy. In addition, Recommendation V.22 and Recommendation V.22bis are both Recommendations for use in performing data communications. The S1 signal and SB1 signal are the procedure signals transmitted from the calling terminal to the answering terminal in the case where data communications are performed.

V.32 detection section 111 and V.32bis detection section 112 each calculates an integrated value of a signal component at a carrier frequency of 1800 Hz used in Recommendation V.32 and Recommendation V.32bis. Specifically, V.32 detection section 111 and V.32bis detection section 112 each calculates the integrated value of the signal component at the carrier frequency of the AA signal that is transmitted from a calling to an answering terminal in Recommendation V.32 and Recommendation V32bis, as the signal energy. In addition, Recommendation V.32 and Recommendation V.32bis are both Recommendations for use in performing data communications. The AA signal is the procedure signal transmitted from the calling terminal to the answering terminal in the case where data communications are performed.

Variable signal detection section 105 is not limited in the integrated values of signal components at carrier frequencies as described above, and can calculate integrated values of signal components at carrier frequencies used in other Recommendations, such as, for example, the integrated value of the signal component at the carrier frequency used in Recommendation V.23, and the integrated value of the signal component at the carrier frequency used in Recommendation V.26bis.

2100 Hz detection section 106 is used in the case where communication terminal apparatus 1 functions as a calling terminal, and calculates an integrated value of a signal component of a carrier frequency of 2100 Hz. Specifically, 2100 Hz detection section 106 calculates the integrated value of the signal component at the carrier frequency of, for example, the ANSam signal that is transmitted from an answering terminal to a calling terminal in Recommendation V.8 or the CED signal that is transmitted from an answering terminal to a calling terminal in Recommendation T.30, as the respective signal energy.

V.8 signal detection section 107 analyzes a received signal received in reception section 103. V.8 signal detection section 107 detects the JM signal when the received signal is the JM signal, further detects the CM signal when the received signal is the CM signal, and furthermore detects the CJ signal when the received signal is the CJ signal. In addition, V.8 signal detection section 107 receives the CM signal and CJ signal as received signals when communication terminal apparatus 1 functions as an answering terminal. On the other hand, V.8 signal detection section 107 receives the JM signal as the received signal when communication terminal apparatus 1 functions as a calling terminal. When V.8 signal detection section 107 detects the JM signal, CM signal or CJ signal, the section 107 notifies host 113 of the reception of the respective signal.

Detection sections 108 to 112 set in variable signal detection section 105 and 2100 Hz detection section 106 are each connected to maximum-value detection section 114. Maximum-value detection section 114 detects a maximum value from among integrated values of signal components at carrier frequencies calculated in detection sections 108 to 112 and 2100 Hz detection section 106. Specifically, maximum-value detection section 114 compares the respective integrated values of signal components at carrier frequencies calculated in detection sections 108 to 112 set in variable signal detection section 105 and 2100 Hz detection section 106 to each other to detect the maximum value of the integrated value of the signal component at the carrier frequency. In addition, maximum-value detection section 114 is connected to comparison section 115.

Comparison section 115 has predetermined thresholds registered thereto for each integrated value of the signal component at the carrier frequency. Comparison section 115 compares the maximum value detected in maximum-value detection section 114 to the registered threshold. When the maximum value exceeds the predetermined threshold, comparison section 115 detects an identification signal indicative of the detection section that calculates the maximum value, and based on the identification signal, notifies host 113 of a type of the received signal.

Host 113 is provided with control section 116 that controls the whole operations of communication control unit 100. Host 113 is further provided with DIS determination section 117 that determines whether or not the received signal notified from modem 101 is the DIS signal, DCS determination section 118 that determines whether or not the received signal notified from modem 101 is the DCS signal, and memory 121 in which detection frequency table 119 and communication capability table 120 are stored. In addition, DIS determination section 117 is used when communication terminal apparatus 1 functions as a calling terminal, and DCS determination section 118 is used when communication terminal apparatus 1 functions as an answering.

Detection frequency table 119 is a table for use by control section 116 in setting a band pass filter of variable signal detection section 105 in modem 101. Communication capability table 120 is a table for use by control section 116 in setting the CM signal that notifies the answering terminal of communication capabilities of communication control unit 100.

Figure 6:
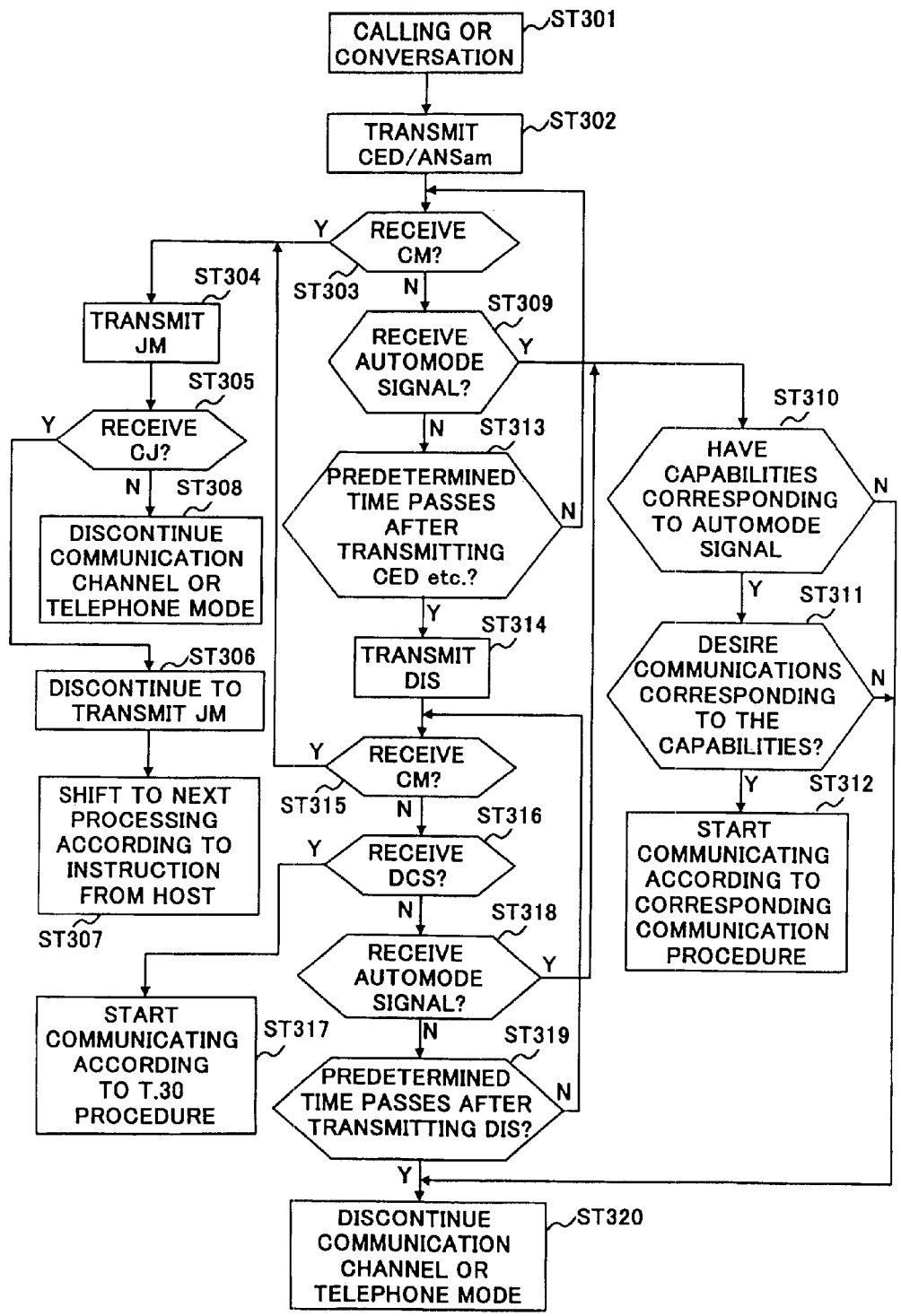
FIG. 6 is a flowchart to explain operations in the case where the communication control unit of the communication terminal apparatus of the above embodiment performs a FAX preferential communication.
Figure 7:
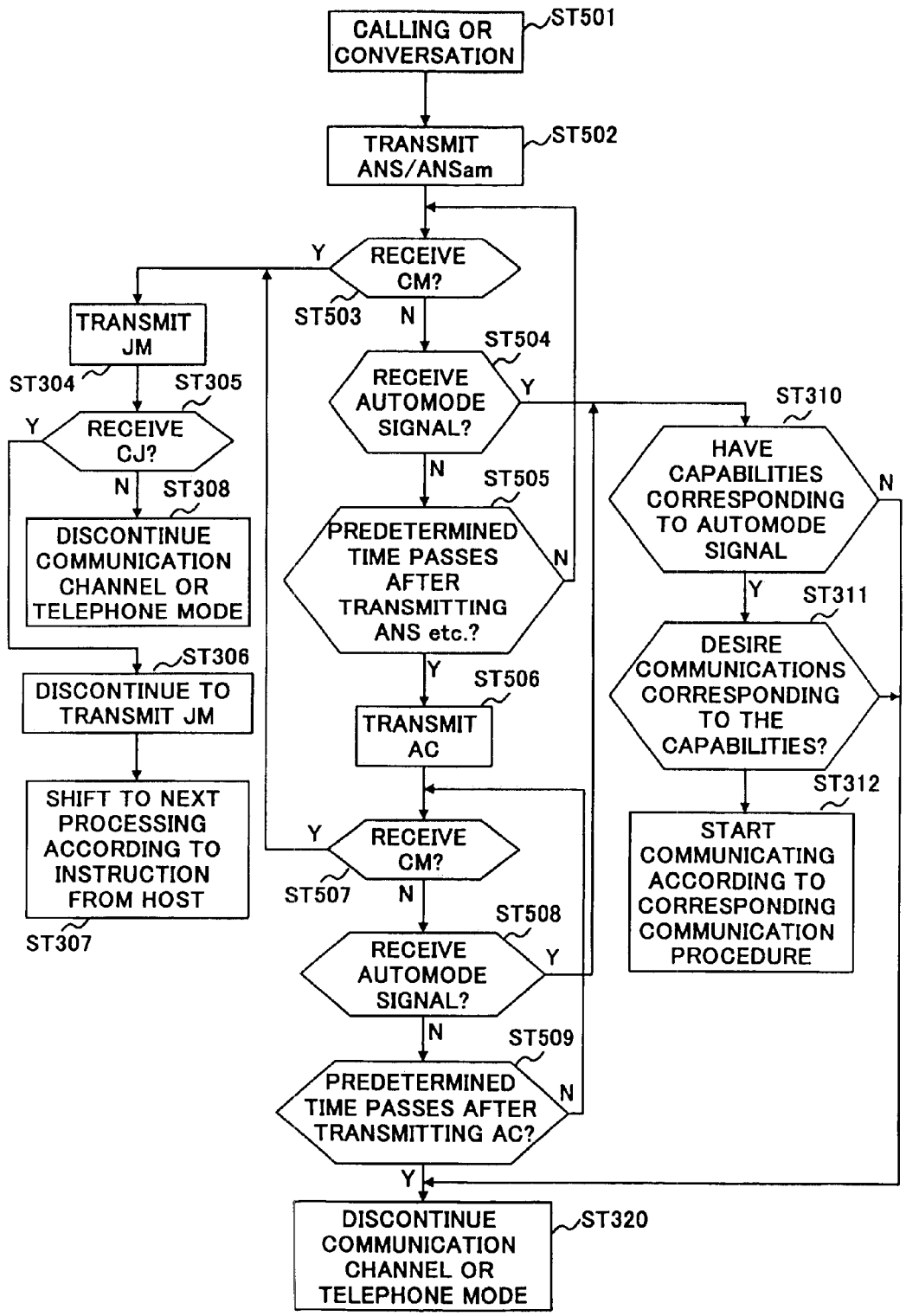
FIG. 7 is a flowchart to explain operations in the case where the communication control unit of the communication terminal apparatus of the above embodiment performs a data preferential communication.

Operations of communication control unit 100 with the above-mentioned configuration are next explained for two cases; the case that communication control unit 100 performs communications preferentially according to the communication procedure conforming to Recommendation T.30 (hereinafter referred to as "FAX preferential communications"), and the case that communication control unit 100 performs communications according to the communication procedure conforming to Recommendation V.22/22bis and Recommendation V.32/32bis and so on (hereinafter referred to as "data preferential communication"). FIG. 6 illustrates a flowchart in the case where communication control unit 100 performs the FAX preferential communication. FIG. 7 illustrates a flowchart in the case where communication control unit 100 performs the data preferential communication. The flow in the case where communication control unit 100 performs the FAX preferential communication is first explained. In addition, it is assumed that communication terminal apparatus 1 is an answering terminal.

First, communication control unit 100 answers a call placed from a calling terminal.

When communication control unit 100 answers the call, or receives a predetermined instruction from an operator while calling in the telephone mode (ST301), modem 101 of communication control unit 100 transmits based on the instruction from host 113 the CED signal specified in Recommendation T.30 or the ANsam signal specified in Recommendation V.8 to the calling terminal (ST302).

After transmitting the CED signal or ANsam signal, communication control unit 100 determines whether or not the CM signal specified in Recommendation V.8 is received from the calling terminal (ST303). Specifically, V.8 signal detection section 107 of modem 101 analyzes the received signal received from the calling terminal, and notifies host 113 of the analyzed result. Host 113 determines whether or not the CM signal is received when receives the notification.

At this point, in the case where the CM signal is received from the calling terminal, since communication control unit 100 has the function for performing communications based on the communication procedure conforming to Recommendation V.8, communication control unit 100 performs communications based on the communication procedure conforming to Recommendation V.8.

Namely, in the case where the CM signal is received from the calling terminal, based on the instruction from host 113, transmission section 104 of modem 101 transmits the JM signal to the calling terminal (ST304).

After transmitting the JM signal, communication control unit 100 determines whether or not the CJ signal specified in Recommendation V.8 is received from the calling terminal (ST305). Specifically, V.8 signal detection section 107 of modem 101 analyzes the signal received from the calling terminal, and notifies host 113 of the analyzed result. Host 113 determines whether or not the CJ signal is received when receives the notification.

At this point, in the case where the CJ signal is received from the calling terminal, transmission section 104 of modem 101 discontinues the transmission of the JM signal (ST306). Then, based on the instruction from host 113, modem 101 shifts to the next processing (ST307). Accordingly, modem 101 finishes the communication procedure based on Recommendation V.8. Then, modem 101 performs a communication based on a communication procedure which is recognized during the communication procedure of Recommendation V.8 and is the most appropriate for a. communication with the calling terminal. The communication procedure which is recognized during the communication procedure of Recommendation V.8 and is the most appropriate for the communication with the calling terminal includes communication procedures conforming to, for example, Recommendation V.34, Recommendation V.90, Recommendation V.91 and Recommendation V.92.

In addition, in the case where a predetermined time passes while the CJ signal is not received, based on the instruction from host 113, modem 101 discontinues the communication channel, or returns to the telephone mode (ST308).

On the other hand, in the case where the CM signal is not received from the calling terminal, communication control unit 100 determines whether or not an automode signal (i.e. AA signal defined in Recommendation V.32bis) is received from the calling terminal (ST309). In addition, the automode signal Includes, for example, the S1 signal and SB1 signal specified in Recommendation V.22/V.22bis, and AA signal specified in Recommendation V.32/V.32bis.

Specifically, variable signal detection section 105 of modem 101 calculates the integrated value of the signal component at the carrier frequency of the received signal. Then, variable signal detection section 105. outputs the calculated integrated values to maximum-value detection section 114. Maximum-value detection section 114 detects the maximum value of the integrated value. Maximum-value detection section 114 outputs the maximum value to comparison section 115. Comparison section 115 compares the maximum value to the registered threshold. Then, when the maximum-value exceeds the predetermined threshold, comparison section 115 detects an identification signal indicative of the detection section that calculates the maximum value, and based on the identification signal, notifies host 113 of the type of the received signal. After receiving the notification, host 113 determines whether or not the automode signal is received.

At this point, in the case where the signal is received, it is determined whether or not communication control unit 100 has the communication capabilities corresponding to the received automode signal. When communication control unit 100 has the communication capabilities corresponding to the received automode signal, communication control unit 100 performs communications based on the communication procedure corresponding to the automode signal.

Specifically, in communication control unit 100, host 113 determines whether or not the apparatus 100 has the communication capabilities corresponding to the automode signal (ST310). When communication control unit 100 has the communication capabilities corresponding to the automode signal, host 113 determines whether or not an operator desires to perform communications with the communication capabilities (ST311). When the operator desires to perform communications with the communication capabilities, based on the instruction from host 113, modem 101 performs communications based on the communication procedure corresponding to the received automode signal (ST312).

For example, when the automode signal received from the calling terminal is the AA signal, the integrated values calculated by V.32 detection section 111 and V.32bis, detection section 112 in variable signal detection section 105 indicate the maximum value in the processing performed by maximum-value detection section 114, and exceeds the registered threshold value in the processing performed by comparison section 115. Comparison section 115 detects identification signals indicative of V.32 detection section 111 and V.32bis detection section 112, and based on the identification signals, notifies host 113 that the received signal is the AA signal. When host 113 receives the notification, host 113 determines whether or not communication control unit 100 has the communication capabilities corresponding to Recommendation V.32 or V.32bis. When communication control unit 100 has the communication capabilities corresponding to Recommendation V.32 or V.32bis, it is determined whether or not an operator desires to perform communications with the communication capabilities. When the operator desires to perform communications with the communication capabilities, based on the instruction from host 113, modem 101 performs communications based on the communication procedure corresponding to Recommendation V.32 or V.32bis.

In addition, in the case where communication control unit 100 does not have the communication capabilities corresponding to the automode signal, or in the case where the operator does not desire to perform communications with the communication capabilities corresponding to the automode signal, based on the instruction from host 113, modem 101 discontinues the communication channel, or returns to the telephone mode (ST320).

On the other hand, when the automode signal is not received, in communication control unit 100, host 113 determines whether or not a predetermined time passes after initiating the transmission of the CED signal or ANSam signal at ST302 (ST313).

At this point, when the predetermined time passes after initiating the transmission of the CED signal or ANSam signal, since communication control unit 100 is set to perform the FAX preferential communication, based on the instruction from host 113, transmission section 104 of modem 101 transmits the DIS signal specified in Recommendation T.30 to the calling terminal (ST314). Thereafter, communication control unit 100 shifts to a FAX communication mode. In addition, when the predetermined time does not pass after initiating the transmission of the CED signal or ANSam signal, host 113 repeats the processing of ST303 to ST313.

After transmitting the DIS signal to the calling terminal, communication control unit 100 determines whether or not the CM signal is received from the calling terminal (ST315). In communication terminal apparatus 1, after transmitting the DIS signal, and shifting to the FAX communication mode, variable signal detection section 105 still monitors the signal component at the carrier frequency of the received signal, which is different from the conventional communication terminal apparatus that cannot receive any signal except the DCS signal specified in Recommendation T.30 which is an expected signal when the DIS signal is transmitted. Accordingly, communication terminal apparatus 1 can concurrently detect the procedure signal specified in Recommendation T.30 and the other procedure signals specified in Recommendations other than Recommendation T.30. It is thus possible for communication terminal apparatus 1 to recognize the procedure signal transmitted from the calling terminal, and consequently to prevent the communication from causing the looped condition.

At this point, when the CM signal is received from the calling terminal, since communication control unit 100 has the function for performing communications based on the communication procedure conforming to Recommendation V.8, communication control unit 100 performs communications based on the communication procedure conforming to Recommendation V.8. In addition, in this case, communication control unit 100 executes the same processing as in ST304 to ST308.

On the other hand, when the CM signal is not received from the calling terminal, communication control unit 100 determines whether or not the DCS signal specified in Recommendation T.30 is received from the calling terminal (ST316). In addition, when the determination on the DCS signal is performed, communication control unit 100 executes the same processing as in the case where the determination on the automode signal is performed.

At this point, when the DCS signal is received, since communication control unit 100 is set to perform the FAX preferential communication, communication control unit 100 performs communications based on the communication procedure conforming to Recommendation T.30 (ST317).

On the other hand, when the DCS signal is not received, communication control unit 100 determines whether or not the automode signal is received from the calling terminal (ST318). In addition, in this case, communication control unit 100 executes the same processing in ST309.

At this point, when the automode signal is received from the calling terminal, it is determined whether or not communication control unit 100 has the communication capabilities corresponding to the received automode signal. Then, when communication control unit 100 has the communication capabilities corresponding to the received automode signal, communication control unit 100 performs communications based on the communication procedure corresponding to the automode signal. In addition, in this case, communication control apparatus 100 executes the same processing as in ST310 to ST312.

On the other hand, when the automode is not received from the calling terminal, host 113 determines whether or not a predetermined time passes after initiating the transmission of the DIS signal at ST314 (ST319).

At this point, when the predetermined time passes after initiating the transmission of the DIS signal, based on the instruction from host 113, modem 101 discontinues the communication channel, or returns to the telephone mode (ST320). In addition, when the predetermined time does not pass after initiating the transmission of the DIS signal, host 113 repeats the processing of ST315 to ST319.

FIG. 8 illustrates a sequence diagram in the case where various signals are received after transmitting the DIS signal at ST314 in the above-mentioned flow.

Figure 8A:
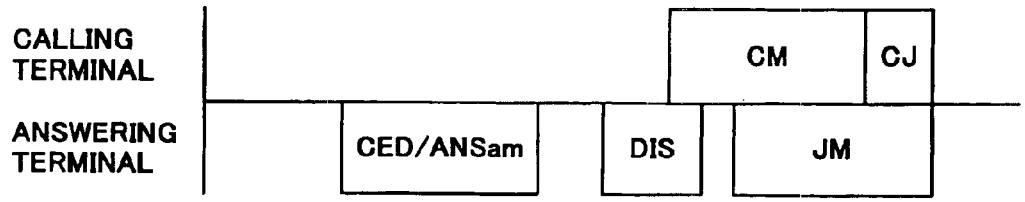
FIG. 8A is a sequence diagram in the case where the communication control unit of the communication terminal apparatus of the above embodiment receives various signals after transmitting a DIS signal.

FIG. 8A illustrates the case that the CM signal is received at ST315, and the communication is performed based on the communication procedure conforming to Recommendation V.8. As illustrated in FIG. 8A, in the case where the calling terminal transmits the CM signal after communication control unit 100 transmits the DIS signal to the calling terminal, transmitting the JM signal in response to the CM signal prevents the communication from causing the looped condition.

Figure 8B:
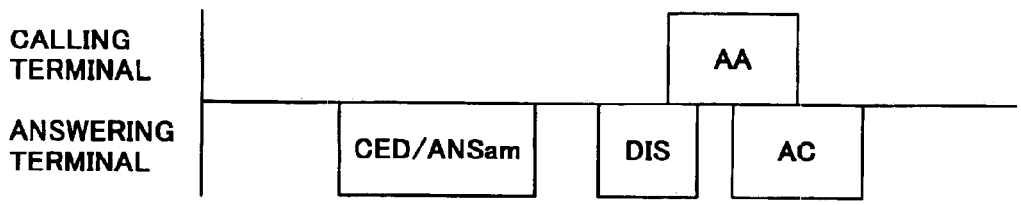
FIG. 8B is a sequence diagram in the case where the communication control unit of the communication terminal apparatus of the above embodiment receives various signals after transmitting a DIS signal.

FIG. 8B illustrates the case that the AA signal is received at ST318, the communication is performed based on the commination procedure conforming to Recommendation V.32/V.32bis. In the same way as receiving the CM signal at ST315, transmitting the AC signal in response to the AA signal prevents the communication from causing the looped condition.

Figure 8C:
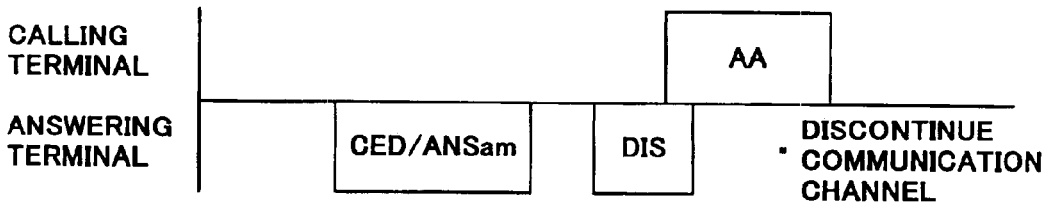
FIG. 8C is a sequence diagram in the case where the communication control unit of the communication terminal apparatus of the above embodiment receives various signals after transmitting a DIS signal.

FIG. 8C illustrates the case that communication control unit 100 does not have the communication capabilities corresponding to the AA signal at ST310, or that the operator dose not desire to perform communications with the communication capabilities corresponding to the AA signal at ST311. In the former case, since communication control unit 100 does not have the communication capabilities corresponding to the AA signal, discontinuing the communication channel prevents the communication from causing the looped condition.

Thus, communication control unit 100 performs the FAX preferential communication. In this case, even when communication control unit 100 transmits the DIS signal without receiving the predetermined signal from the calling terminal after transmitting the CED signal or ANSam signal, variable signal detection section 105 monitors the signal component at the carrier frequency of the received signal. Accordingly, communication control unit 100 can detect the CM signal or automode signal while transmitting the DIS signal. It is thereby possible for communication terminal apparatus 1 to shift to the next processing based on the CM signal or automode signal. As a result, it is possible to prevent the communication in the communication terminal apparatus 1 from causing the looped condition.

The flow in the case where communication terminal apparatus 1 performs the data preferential communication is next explained.

First, communication control unit 100 answers a call placed from a calling terminal.

When communication control unit 100 answers the call, or receives a predetermined instruction from an operator while calling in the telephone mode (ST501), modem 101 of communication control unit 100 transmits based on the instruction from host 113 the ANS signal specified, for example, in Recommendation V.32 or the ANsam signal specified in Recommendation V.8 to the calling terminal (ST502).

After transmitting the ANS signal or ANsam signal, communication control unit 100 determines whether or not the CM signal specified in Recommendation V.8 is received from the calling terminal (ST503). Specifically, V.8 signal detection section 107 of modem 101 analyzes the received signal from the calling terminal, and notifies host 113 of the analyzed result. Host 113 determines whether or not the CM signal is received when receives the notification.

At this point, when the CM signal is received from the calling terminal, since communication control unit 100 has the function for performing communications based on the communication procedure conforming to Recommendation V.8, communication control unit 100 performs communications based on the communication procedure conforming to Recommendation V.8. In addition, in the case where the communication is performed based on the communication procedure conforming to Recommendation V.8, communication control unit 100 executes the operations of ST304 to ST308 in the same way as performing the FAX preferential communication.

On the other hand, when the CM signal is not received from the calling terminal, communication control unit 100 determines whether or not the automode signal is received from the calling terminal (ST504). In addition, in the case where communication control unit 100 determines whether or not the automode signal is received, or executes the processing of the case where the outmode signal is received, communication control unit 100 performs the operations of ST310 to ST312 in the same way as performing the FAX preferential communication.

In addition, when communication control unit 100 does not have the communication capabilities corresponding to the automode signal, or the operator does not desire to perform communications with the communication capabilities corresponding to automode signal, communication control unit 100 discontinues the communication channel, or returns to the telephone mode, based on the instruction from host 113, in the same way as in the case where communication control unit 100 performs the FAX preferential communication (ST320).

When the automode signal is not received, in communication control unit 100, host 113 determines whether or not a predetermined time passes after initiating the transmission of the ANS signal or ANSam signal at ST502 (ST505).

At this point, when the predetermined time passes after initiating the transmission of the ANS signal or ANSam signal, since communication control unit 100 is set to perform the data preferential communication, based on the instruction from host 113, transmission section 104 of modem 101 transmits the AC signal specified in, for example, Recommendation V.32 to the calling terminal (ST506). Thereafter, communication control unit 100 shifts to a data communication mode. In addition, when the predetermined time does not pass after initiating the transmission of the ANS signal or ANSam signal, host 113 repeats the processing of ST503 to ST505.

After transmitting the AC signal to the calling terminal, communication terminal apparatus 1 determines whether or not the CM signal is received from the calling terminal (ST507). In communication control unit 100, after transmitting the AC signal, and shifting to the data communication mode, variable signal detection section 105 still monitors the signal component at the carrier frequency of the received signal, which is different from the conventional communication terminal apparatus that cannot receive any signal except the AA signal specified in, for example, Recommendation V.32 which is an expected signal when the AC signal is transmitted. Accordingly, communication terminal apparatus 1 can concurrently detect the procedure signal specified in, for example, Recommendation V.32 and the other procedure signals specified in Recommendations other than the corresponding Recommendation. It is thus possible for communication terminal apparatus 1 to recognize the procedure signal transmitted from the calling terminal, and consequently to prevent the communication from causing the looped condition.

At this point, when the CM signal is received from the calling terminal, since communication control unit 100 has the function for performing communications based on the communication procedure conforming to Recommendation V.8, communication control unit 100 performs the communication based on the communication procedure conforming to Recommendation V.8. In addition, in this case, communication control unit 100 executes the same processing as at ST304 to ST308.

On the other hand, when the CM signal is not received form the calling terminal, communication control unit 100 determines whether or not the automode signal is received from the calling terminal (ST508). In addition, in this case, communication control unit 100 executes the same processing as at ST504.

At this point, when the automode signal is received from the calling terminal, it is determined whether or not communication control unit 100 has the communication capabilities corresponding to the received automode signal. Then, when communication control unit 100 has the communication capabilities corresponding to the received automode signal, communication control unit 100 performs the communication based on the communication procedure corresponding to the automode signal. In addition, in this case, communication control unit 100 executes the same processing as at ST310 to ST312.

On the other hand, when the automode is not received from the calling terminal, host 113 determines whether or not a predetermined time passes after initiating the transmission of the AC signal at ST506 (ST509).

At this point, when the predetermined time passes after initiating the transmission of the AC signal, based on the instruction from host 113, modem 101 discontinues the communication channel, or returns to the telephone mode (ST320). In addition, when the predetermined time does not pass after initiating the transmission of the AC signal, host 113 repeats the processing of ST507 to ST509.

Figure 9:
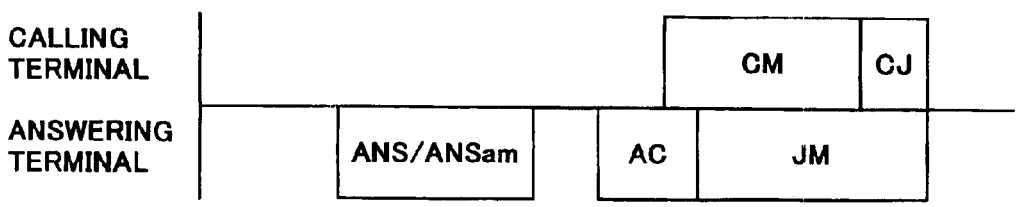
FIG. 9 is a sequence diagram in the case where the communication control unit of the communication terminal apparatus of the above embodiment receives a CM signal after transmitting an AC signal.

FIG. 9 illustrates a sequence diagram in the case where the CM signal is received from the calling terminal after transmitting the AC signal at ST506 in the above-mentioned flow. FIG. 9 illustrates the case that the CM signal is received at ST507, and then the communication is performed based on the communication procedure conforming to V.8 Recommendation. As illustrated in FIG. 9, even in the case where the calling terminal transmits the CM signal after communication control unit 100 transmits the AC signal to the calling terminal, transmitting the JM signal in response to the CM signal prevents the communication from causing the looped condition.

Thus, communication control unit 100 performs the data preferential communication. In this case, even when communication control unit 100 transmits the AC signal without receiving the predetermined signal from the calling terminal after transmitting the ANS signal or ANSam signal, variable signal detection section 105 monitors the signal component at the carrier frequency of the received signal. Accordingly, communication control unit 100 can detect the CM signal while transmitting the AC signal. It is thereby possible for communication terminal apparatus 1 to shift to the next processing based on the received CM signal. As a result, it is possible to prevent the communication in the communication control apparatus 100 from causing the looped condition.

Thus, according to communication terminal apparatus 1 of this embodiment, after transmitting the DIS signal to the calling terminal in the case where the FAX preferential communication is performed, by detecting the signal component at the carrier frequency of the procedure signal conforming to an arbitrary type of Recommendation transmitted from a calling terminal it is possible to shift to the next processing based on the procedure signal. As a result, it is possible to prevent the communication in communication terminal apparatus 1 from causing the looped condition.

Further, according to communication terminal apparatus 1 of this embodiment, after transmitting, for example, the AC signal to the calling terminal in the case where the data preferential communication is performed, by detecting the signal component at the carrier frequency of the procedure signal conforming to an arbitrary type of Recommendation transmitted from a calling terminal, it is possible to shift to the next processing based on the procedure signal. As a result, it is possible to prevent the communication in communication terminal apparatus 1 from causing the looped condition.

Furthermore, according to communication terminal apparatus 1 of this embodiment, by setting variable signal detection section 105 of modem 101, it is possible to limit the reception of the procedure signal conforming to an arbitrary type of Recommendation received from the calling terminal. It is thereby possible for a user to designate the type of Recommendation that the user desires to communicate. For example, in the case where communication terminal apparatus 1 receives the procedure signal specified in the type of Recommendation which communication terminal apparatus 1 cannot respond is received, the setting to immediately discontinue the communication channel with the calling terminal can reduce the communication time with the calling terminal with which communication terminal apparatus 1 cannot communicate and therefore further reduce the communication cost.

In addition, this embodiment describes communication terminal apparatus 1 with the function for performing communications based on the communication procedure conforming to Recommendation V.8. However, this embodiment is not limited to such apparatuses with the function for performing communications based on the communication procedure conforming to Recommendation V.8. For example, this embodiment is applicable to, for example, a communication terminal apparatus with the function for performing communications based on the communication procedures conforming to Recommendation V.30 and Recommendation V.32, in other words, communication terminal apparatus with the function for performing both FAX communication and data communication. By applying this embodiment to such apparatus, in the case where the apparatus receives the AA signal from the calling terminal after transmitting the DIS signal in the FAX communication mode, it is possible to shift to the next processing based on the AA signal. As a result, it is possible to prevent the communication in the communication terminal apparatus from causing the looped condition.

As described above, according to the present invention, the procedure signal conforming to an arbitrary Recommendation transmitted from the calling terminal is detected after the procedure signal specified in the predetermined Recommendation, thereby it is possible to respond to the communication procedure conforming to the arbitrary Recommendation, and consequently assuredly prevent the apparatus itself from causing the looped condition.

The present invention is not limited to the above described embodiments, and various variations and modifications may be possible without departing from the scope of the present invention.

This application is based on the Japanese Patent Application No. HEI11-257399 filed on Sep. 10, 1999, entire content of which is expressly incorporated by reference herein.

What is claimed is:

1. A receiving modem that is configured to perform transmission and reception of signals with a transmitting modem, the receiving modem comprising:

a transmitter that is configured to transmit a facsimile control signal;

a detector that is configured to detect a response signal to the facsimile control signal transmitted from the transmitting modem;

a controller that is configured to communicate with the transmitting modem based on the communication procedure specified in ITU Recommendation V.8, when a CM signal is detected while awaiting the response signal to the facsimile control signal, and to data communicate with the transmitting modem, when a signal used in data communication is detected while awaiting the response signal to the facsimile control signal, the data communication not including voice communication and being in accordance with a defined communication procedure.

2. The receiving modem according to claim 1, wherein the facsimile control signal is a DIS signal specified in ITU Recommendation T.30, and the controller executes data communications with the transmitting modem based on the data communication procedure specified in ITU Recommendation V.22, when a SI signal is detected as the response signal.

3. The receiving modem according to claim 1, wherein the facsimile control signal is a DIS signal specified in ITU Recommendation T.30, and the controller executes data communication the transmitting modem based on the data communication procedure specified in ITU Recommendation V.32, when an AA signal is detected as the response signal.

4. A receiving modem that is configured to perform transmission and reception of signals with a transmitting modem, the receiving modem comprising:
- a transmitter that is configured to transmit a data communication signal;
- a detector that is configured to detect a response signal to the data communication signal transmitted from the transmitting modem;
- a controller that is configured to communicate with the transmitting modem based on the communication procedure specified in ITU Recommendation V.8, when a CM signal is detected while awaiting the response signal to the data communication signal, and to data communicate with the transmitting modem, when a signal used in data communication is detected while awaiting the response signal to the data communication signal, the data communication not including voice communication and being in accordance with a defined communication procedure.

5. The modem according to claim 4, wherein the data communication signal is an AC signal specified in at least one of ITU Recommendation V.22 and V.23.

6. A communication control apparatus provided with a receiving modem that is configured to perform transmission and reception of signals with a transmitting modem, the receiving modem comprising:
- a transmitter that is configured to transmit a facsimile control signal;
- a detector that is configured to detect a response signal to the facsimile control signal transmitted from said transmitting modem;
- a controller that is configured to communicate with the transmitting modem based on the communication procedure specified in ITU Recommendation V.8, when a CM signal is detected while awaiting the response signal to the facsimile control signal, and to data communicate with the transmitting modem, when a signal used in data communication is detected while awaiting the response signal to the facsimile control signal, the data communication not including voice communication and being in accordance with a defined communication procedure.

7. The communication control apparatus according to claim 6, wherein the facsimile control signal is a DIS signal specified in ITU Recommendation T.30, and the controller executes communications with the transmitting modem based on the data communication procedure specified in ITU Recommendation V.22, when a SI signal is detected as the response signal.

8. The communication control apparatus according to claim 6, wherein the facsimile control signal is a DIS signal specified in ITU Recommendation T.30, and the controller executes communications with the transmitting modem based on the data communication procedure specified in ITU Recommendation V.32, when an AA signal is detected as the response signal.

9. A communication control apparatus provided with a receiving modem that is configured to perform transmission and reception of signals with a transmitting modem, the receiving modem comprising:
- a transmitter that is configured to transmit a data communication signal;
- a detector that is configured to detect a response signal to the data communication signal transmitted from the transmitting modem;
- a controller that is configured to communicate with the transmitting modem based on the communication procedure specified in ITU Recommendation V.8, when a CM signal is detected while awaiting the response signal to the data communication signal, and to data communicate with the transmitting modem, when a signal used in data communication is detected while awaiting the response signal to the data communication signal, the data communication not including voice communication and being in accordance with a defined communication procedure.

10. The communication control apparatus according to claim 9, wherein the data communication signal is an AC signal specified in at least one of ITU Recommendation V.22 and V.23.

11. A method for controlling a communication having a receiving modem that is configured to perform a transmission and reception of signals with a transmitting modem, the method comprising:
- transmitting a facsimile control signal;
- detect in response signal to the facsimile control signal transmitted from the transmitting modem;
- communicating with the transmitting modem based on the communication procedure specified in ITU Recommendation V.8, when a CM signal is detected while awaiting the response signal to the facsimile control signal, and data communicating with the transmitting modem, when a signal used in data communication is detected while awaiting the response signal to the facsimile control signal, the data communication not including voice communication and being in accordance with a defined communication procedure.

12. The method for controlling a communication having the receiving modem according to claim 11, wherein the facsimile control signal is a DIS signal specified in ITU Recommendation T.30 and the communicating executes communications with the transmitting modem based on the data communication procedure specified in ITU Recommendation V.22, when a SI signal is detected as the response signal.

13. The method for controlling a communication having the receiving modem according to claim 11, wherein the facsimile control signal is a DIS signal specified in ITU Recommendation T.30 and the communicating executes communications with the transmitting modem based on the data communication procedure specified in ITU Recommendation V.32, when an AA signal is detected as the response signal.

14. A method for controlling a communication having a receiving modem that is configured to perform transmission and reception of signals with a transmitting modem, the method comprising:
- transmitting a data communication signal;
- detecting a response signal to the data communication signal transmitted from the transmitting modem,
- communicating with the transmitting modem based on the communication procedure specified in ITU Recommendation V.8, when a CM signal is detected while awaiting the response signal to the data communication signal, and to data communicate with the transmitting modem, when a signal used in data communication is detected while awaiting the response signal to the data communication signal, the data communication not including voice communication and being in accordance with a defined communication procedure.

15. The method for controlling a communication having the receiving modem according to claim 14, wherein the data communication signal is an AC signal specified in at least one of ITU Recommendation V.22 and V.23.

16. A receiving modem that is configured to perform transmission and reception of signals with a transmitting modem, the receiving modem comprising:
- a transmitter that is configured to transmit, as a facsimile control signal, a DIS signal specified in ITU Recommendation T.30;
- a detector that is configured to detect a response signal to the facsimile control signal transmitted from the transmitting modem;
- a controller that is configured to communicate with the transmitting modem based on the communication procedure specified in ITU Recommendation V.8 when a CM signal is detected while awaiting the response signal to the facsimile control signal, to facsimile communicate with the transmitting modem based on the communication procedure specified in ITU Recommendation T.30 when a DCS signal specified in ITU Recommendation T.30 is detected while awaiting the response signal to the facsimile control signal, and to data communicate with the transmitting modem when a signal used in data communication is detected while awaiting the response signal to the facsimile control signal, the data communication not including voice communication and being in accordance with a defined communication procedure.

17. The receiving modem according to claim 16, wherein the controller executes data communications with the transmitting modem based on the data communication procedure specified in ITU Recommendation V.22, when a SI signal is detected as the response signal.

18. The receiving modem according to claim 16, wherein the controller executes data communication with the transmitting modem based on the data communication procedure specified in ITU Recommendation V.32, when an AA signal is detected as the response signal.

19. A receiving modem that is configure to perform transmission and reception of signals with a transmitting modem, the receiving modem comprising:
- a transmitter that is configured to transmit, as a data communication signal, an AC signal specified in at least one of Recommendation V.22 and V.23;
- a detector that is configured to detect a response signal to the data communication signal transmitted from the transmitting modem;
- a controller that is configured to communicate with the transmitting modem based on the communication procedure specified in ITU Recommendation V.8 when a CM signal is detected while awaiting the response signal to the data communication signal, to data communicate with the transmitting modem when a signal used in data communication is detected while awaiting the response signal to the data communication signal, the data communication not including voice communication and being in accordance with a defined communication procedure, and to set a telephone mode for voice communication when a response to the data communication signal is not detected.

20. A communication control apparatus provided with a receiving modem that is configured to perform transmission and reception of signals with a transmitting modem, the receiving modem comprising:
- a transmitter that is configured to transmit, as a facsimile control signal, a DIS signal specified in ITU Recommendation T.30;
- detector that is configured to detect a response signal to the facsimile control signal transmitted from said transmitting modem;
- a controller that is configured to communicate with the transmitting modem based on the communication procedure specified in ITU Recommendation V.8, when a CM signal is detected while awaiting the response signal to the facsimile control signal, to facsimile communicate with the transmitting modem based on the communication procedure specified in ITU Recommendation T.30 when a DCS signal specified in ITU Recommendation T.30 is detected while awaiting the response signal to the facsimile control signal, and to data communicate with the transmitting modem, when a signal used in data communication is detected while awaiting the response signal to the facsimile control signal, the data communication not including voice communication and being in accordance with a defined communication procedure.

21. The communication control apparatus according to claim 20, wherein the controller executes communications with the transmitting modem based on the data communication procedure specified in ITU Recommendation V.22, when a SI signal is detected as the response signal.

22. The communication control apparatus according to claim 21, wherein the controller executes communications with the transmitting modem based on the data communication procedure specified in ITU Recommendation V.32, when an AA signal is detected as the response signal.

23. A communication control apparatus provided with a receiving modem that is configured to perform transmission and reception of signals with a transmitting modem, the receiving modem comprising:
- a transmitter that is configured to transmit, as a data communication signal, an AC signal specified in at least one of Recommendation V.22 and V.23;
- a detector that is configured to detect a response signal to the data communication signal transmitted from the transmitting modem;
- a controller that is configured to communicate with the transmitting modem based on the communication procedure specified in ITU Recommendation V.8, when a CM signal is detected while awaiting the response signal to the data communication signal, to data communicate with the transmitting modem when a signal used in data communication is detected while awaiting the response signal to the data communication signal, the data communication not including voice communication and being in accordance with a defined communication procedure, and to set a telephone mode for voice communication when a response to the data communication signal is not detected.

* * * * *